O. SENIOR.
LOADING MACHINE.
APPLICATION FILED FEB. 7, 1916.

1,282,300.

Patented Oct. 22, 1918.
3 SHEETS—SHEET 1.

INVENTOR
Oliver Senior

BY
Hardway Cathey
ATTORNEYS

O. SENIOR.
LOADING MACHINE.
APPLICATION FILED FEB. 7, 1916.

1,282,300.

Patented Oct. 22, 1918.
3 SHEETS—SHEET 2.

INVENTOR
Oliver Senior
BY
Hardway Cathey
ATTORNEYS

UNITED STATES PATENT OFFICE.

OLIVER SENIOR, OF DEWALT, TEXAS.

LOADING-MACHINE.

1,282,300.  Specification of Letters Patent.  Patented Oct. 22, 1918.

Application filed February 7, 1916. Serial No. 76,612.

*To all whom it may concern:*

Be it known that I, OLIVER SENIOR, a citizen of the United States, residing at Dewalt, in the county of Fort Bend and State of Texas, have invented certain new and useful Improvements in Loading-Machines, of which the following is a specification.

This invention relates to new and useful improvements in a loading machine.

The object of the invention is to provide a device of the character described whereby hay and other like material may be loaded onto wagons, or other vehicles, or formed into stacks.

With the above and other objects in view the invention has particular relation to certain novel features of construction, operation and arrangement of parts an example of which is given in this specification and illustrated in the accompanying drawings wherein:—

Figure 1:
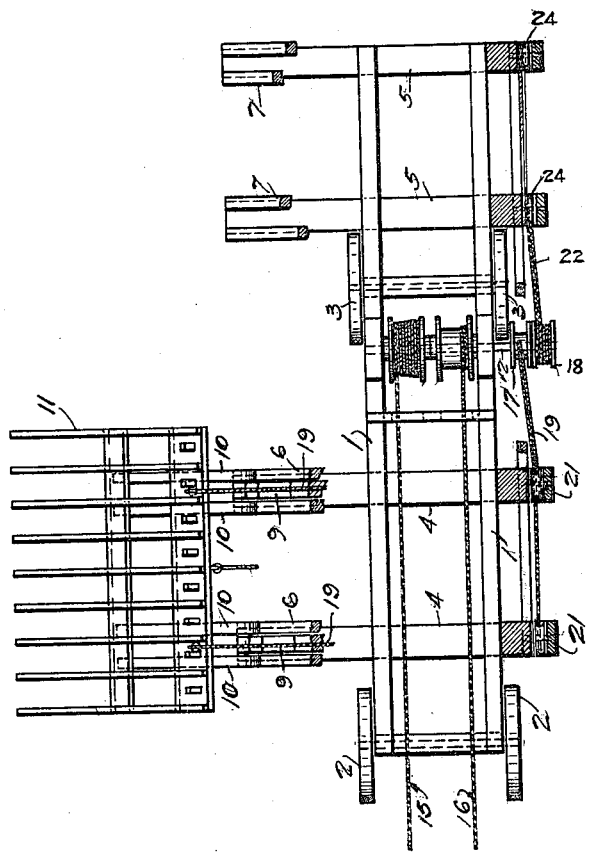
Figure 2:
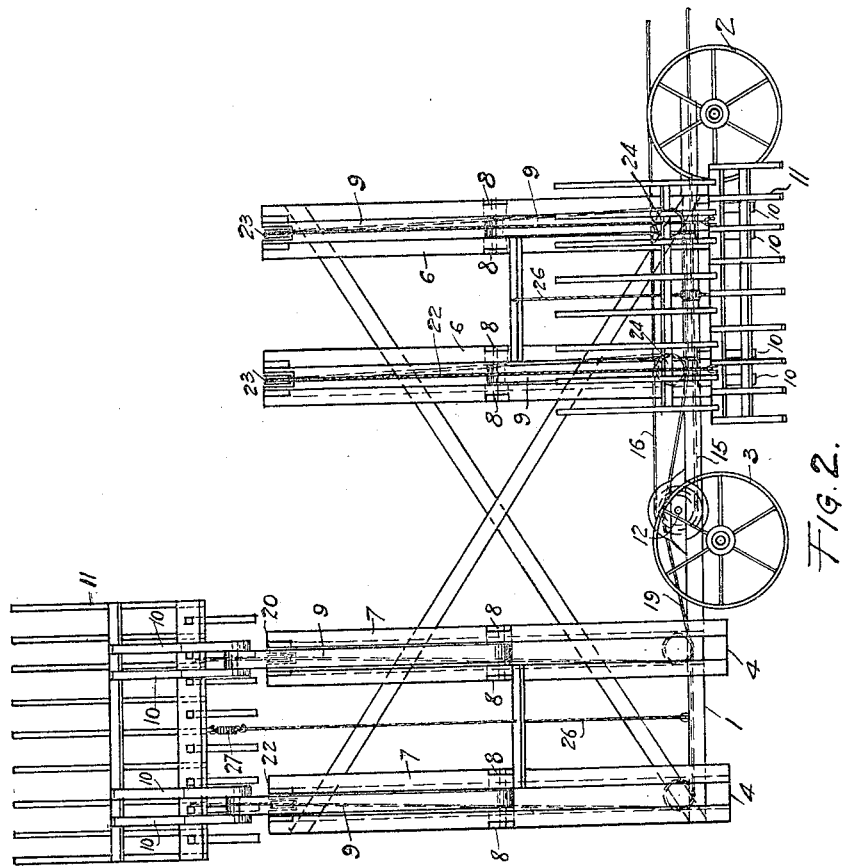
Figure 3:
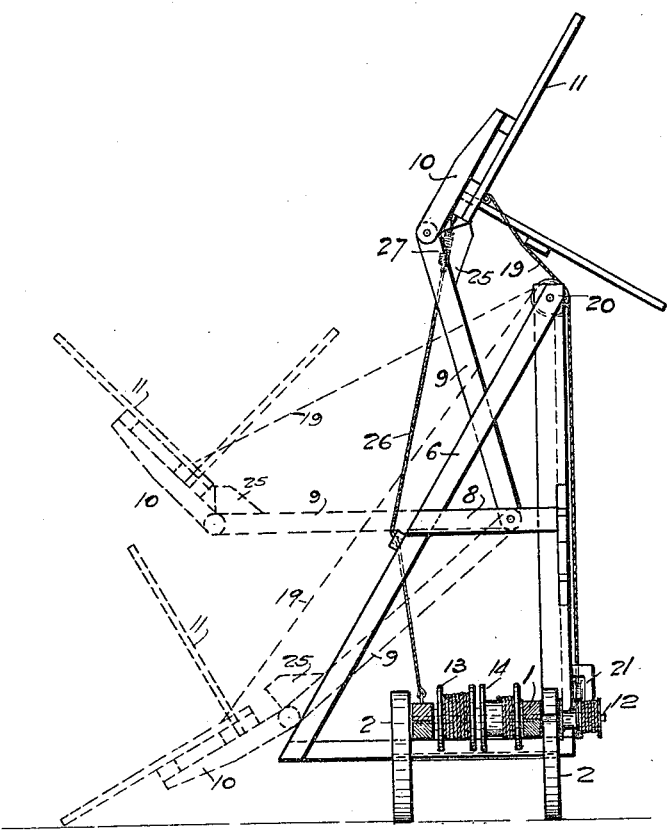

Figure 1 is a plan view of the device,
Fig. 2 is a side elevation thereof, and
Fig. 3 is an end view thereof.

Referring now more particularly to the drawings wherein like numerals of reference designate similar parts in each of the figures the numeral 1 refers to a supporting frame which is mounted upon suitable carrier wheels 2, 2 and 3, 3. Two pairs of transverse beams, composed of the members 4, 4, and 5, 5, are secured to said frame and at one side project out beyond the same, forming supports for the corresponding A-frames 6, 6 and 7, 7. Each of these frames is formed of a pair of beams spaced apart, as shown in Figs. 1 and 2, and they are suitably braced by means of the cross beams 8, 8. The numeral 9 refers to a lifting lever, one being provided for each frame, each of said levers being pivoted at one end between the corresponding cross beams 8 and having its other end free. Pivoted to the free end of each of said levers are the cantaliver arms 10, 10, the pairs of which support the respective baskets 11, 11, which are fixed to said arms and which are composed of a plurality of fingers arranged in series, those of one series extending substantially at right angles to those of the other series.

Rotatably mounted in suitable bearings in the side members of the supporting frame is the transverse shaft 12, fixed upon which and arranged between said side members are the drums 13 and 14, which are rotated through the respective cables 15 and 16 which are wound around said drums in opposite directions. The shaft 12 is extended beyond the supporting frame on the side opposite the baskets and has the drums 17 and 18 fixed thereon. The cables 19, 19 are fixed at one end to one of the baskets 11 and they pass over the respective pulleys 20, and 21 and their other ends are wound around the drum 17 in one direction. The cables 22 are attached at one end to the other basket 11 and pass over the corresponding pulleys 23 and 24 and the other ends are wound around the drum 18 in the opposite direction from the cables 19.

It will be observed from the foregoing description, as well as from an inspection of the drawings that when one of said baskets is elevated, the other one will be lowered. When one of the baskets is lowered, as indicated in Figs. 1 and 2, the hay or other material to be handled may be raked directly into said basket until the same is filled; a pull then exerted upon the cable 15, will operate through the drums described to wind up the cables 19 and elevate the corresponding basket 11, causing the same, when elevated, to tilt forward, on its arm 10 so as to discharge its load upon the vehicle or stack intended to receive the same. At the same time the cables 22 will be unwound from their drum 18, permitting the other basket 11 to descend into position to receive another load. Each of the levers 9 is provided, at its free end with a shoulder 25, which prevents the baskets from tilting too far, forwardly. A cable 26 is also provided for each basket, one end of said cable being attached to the framework 1 and the other end thereof being secured to a strong pull spring 27, which in turn is attached to the corresponding basket. This cable and spring prevents the rearward swing of the arms 10 and the basket carried thereby, and returns the same, if their center of gravity passes beyond the vertical.

What I claim is:

A device of the character described including a supporting framework, a pair of transverse beams secured to the framework at each end and spaced apart and projecting out at one side beyond the framework, forming supports, a pair of A frames mounted on each of said supports and spaced apart, a lifting lever provided for each pair of A-frames, each of said levers being pivoted at one end relative to the corresponding A frame, and operating between the members of each pair and having the other end free, a cantaliver arm pivoted to the free end of each lever, a basket arranged at each end of the framework supported by the free ends of the corresponding arms, said basket being formed of a plurality of fingers arranged in series, those of one series extending substantially at right angles to those of the other series, means for lifting and lowering said levers and the baskets carried thereby, and yieldable means to limit the rearward swinging of said arms and basket and to return the same if their centers of gravity pass beyond the vertical.

In testimony whereof I have signed my name to this specification in the presence of two subscribing witnesses.

OLIVER SENIOR.

Witnesses:
ANNIE L. CARY,
RUBY GLAZNER.

Copies of this patent may be obtained for five cents each, by addressing the "Commissioner of Patents, Washington, D. C."